(12) United States Patent
Walker et al.

(10) Patent No.: US 6,431,612 B1
(45) Date of Patent: Aug. 13, 2002

(54) AIR FLOW CONDUIT QUICK CONNECTOR

(75) Inventors: Daniel H. Walker, Sylvan Lake; Lyle D. Tincknell, Oxford, both of MI (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/750,628

(22) Filed: Dec. 28, 2000

(51) Int. Cl.[7] .................................................. F16L 39/00
(52) U.S. Cl. ........................................ 285/305; 285/319
(58) Field of Search ................................ 285/305, 319, 285/921

(56) References Cited

U.S. PATENT DOCUMENTS

| | | | | |
|---|---|---|---|---|
| 5,090,748 A | * | 2/1992 | Usui et al. ................... 285/319 |
| 5,219,188 A | * | 6/1993 | Abe et al. .................... 285/319 |
| 5,328,216 A | * | 7/1994 | Miyauchi et al. ............ 285/319 |
| 5,540,463 A | * | 7/1996 | Potokar ....................... 285/319 |
| 5,542,716 A | | 8/1996 | Szabo et al. ................ 285/305 |
| 5,586,791 A | * | 12/1996 | Kirchner et al. ............ 285/319 |
| 5,609,370 A | * | 3/1997 | Szabo et al. ................ 285/319 |
| 5,653,475 A | * | 8/1997 | Scheyhing et al. .......... 285/319 |
| 5,725,257 A | * | 3/1998 | Sakane et al. ............... 285/319 |
| 5,730,481 A | | 3/1998 | Szabo et al. ................ 285/305 |
| 5,782,502 A | | 7/1998 | Lewis ........................... 285/87 |
| 5,797,634 A | * | 8/1998 | Bonser ......................... 285/319 |
| 5,863,077 A | | 1/1999 | Szabo et al. ................... 285/3 |
| 5,924,746 A | * | 7/1999 | Fixemer ...................... 285/319 |
| 5,951,063 A | | 9/1999 | Szabo .......................... 285/303 |
| 6,106,028 A | * | 8/2000 | Godeau et al. .............. 285/319 |
| 6,149,206 A | * | 11/2000 | DiRocco ...................... 319/305 |
| 6,199,919 B1 | * | 3/2001 | Kawasaki et al. ........... 285/319 |

\* cited by examiner

*Primary Examiner*—Eric K. Nicholson
(74) *Attorney, Agent, or Firm*—Young & Basile, P.C.

(57) ABSTRACT

A connection between a fluid conduit and an air flow port mounted on an air flow device includes a housing having a through bore which receives a flange on an end form of the conduit. One end of the port is disposed in the bore in the housing in sealed engagement with the end form. A transverse bore in the housing receives a retainer to lock the port in the housing preventing axial separation of the port from the conduit.

8 Claims, 4 Drawing Sheets

AIR FLOW CONDUIT QUICK CONNECTOR

BACKGROUND

Air flow conduits found in automotive vehicles typically are flexible and attached to flow control devices, such as solenoid valves, air compressors, etc. by means of various connectors. One such connector is a Legris type connector having fingers with flexible ends which grab the end of the flexible conduit.

However, this type of connector is susceptible to widely varying component manufacturing tolerances which cause the insertion force to vary between extremely high and low magnitudes. In addition, there is no indication of a fully, sealed connection between the conduit and the connector.

Since the conduits, connectors and air operated devices are typically made by different manufacturers, problems can be encountered due to allowable dimensional tolerance buildup between the various parts. An extreme tolerance buildup could create a "no build" situation.

Thus, it would be desirable to provide a quick connector devised for air flow conduits which overcomes the problems encountered with previously devised air flow conduit connectors. It would also be desirable to provide such an air flow conduit quick connector which has a low insertion force, provides an indication of a fully sealed connection between the conduit and the air flow conduit, as well as a quick connector which minimizes dimensional tolerance buildup which could create a "no build" situation.

SUMMARY

The present invention is an air flow conduit quick connector which is advantageously employed in an application in which a flexible air flow conduit is attached in fluid flow communication to an air flow control device, such as a solenoid valve, air compressor, etc. The quick connector of the present invention finds additional advantageous use with air operated devices and air flow conduits employed in automotive vehicles.

In one aspect of the invention, a connection is provided between an air flow conduit, a conduit having an end form with an annular enlarged diameter flange spaced from one end of the conduit, and an air flow use device. The connection is provided by a quick connector which includes a seal member mounted on the conduit adjacent to the flange, a port adapted to be carried on an air flow device, the port having a through bore extending therethrough and a shoulder formed between an intermediate tubular portion and an enlarged end portion and a housing having a through bore extending between first and second ends. A transverse aperture is formed in the housing intersecting the through bore. A retainer is insertable through the transverse bore. The end form of the conduit is insertable into the housing with the flange on the end form spaced from the second end of the housing. The port is insertable through the first end of the housing into the through bore to a fully sealed position in engagement with the end form of the conduit wherein the retainer is movable through the transverse bore to bring one side edge of the retainer into engagement with the shoulder on the port to prevent axial displacement of the port from the conduit.

In one aspect, the shoulder on the port is spaced from a first end of the port. The flexible conduit has an inner conduit and an outer conduit disposed over the inner conduit, the end form disposed on the inner conduit and projecting outward from one end of the outer conduit. The end of the outer conduit preferably abuts the second end of the housing.

An inner surface as formed adjacent the second end of the housing in the through bore. The inner surface is positioned bias the flange on the conduit into engagement with the port.

In another aspect of the invention, the housing includes a chamber axially spaced from the transverse bore. The chamber receives the joined end form and the end portion of the port.

Also, the housing includes a slot extending from the second end partially through the housing. The slot receives the end form of the conduit for insertion of the end form of the conduit into the chamber in the housing.

The present air flow control quick connector overcomes many of the problems encountered with previously devised air flow quick connectors typically used in automotive vehicles. The quick connector of the present invention provides a fully sealed, secure connection between a flexible air flow conduit and an air flow control device; while at the same time providing low insertion force, high pull out force and an indication of a fully sealed connection. The quick connector to the present invention also minimizes any impact from allowable dimensional tolerance build up in the flexible conduit, the quick connector and the air flow control device which could create an "out of tolerance" or "no build" connection.

BRIEF DESCRIPTION OF THE DRAWING

The various features, advantages and other uses of the present invention will become more apparent by referring to the following detailed description and drawing which.

DETAILED DESCRIPTION

Figure 1:
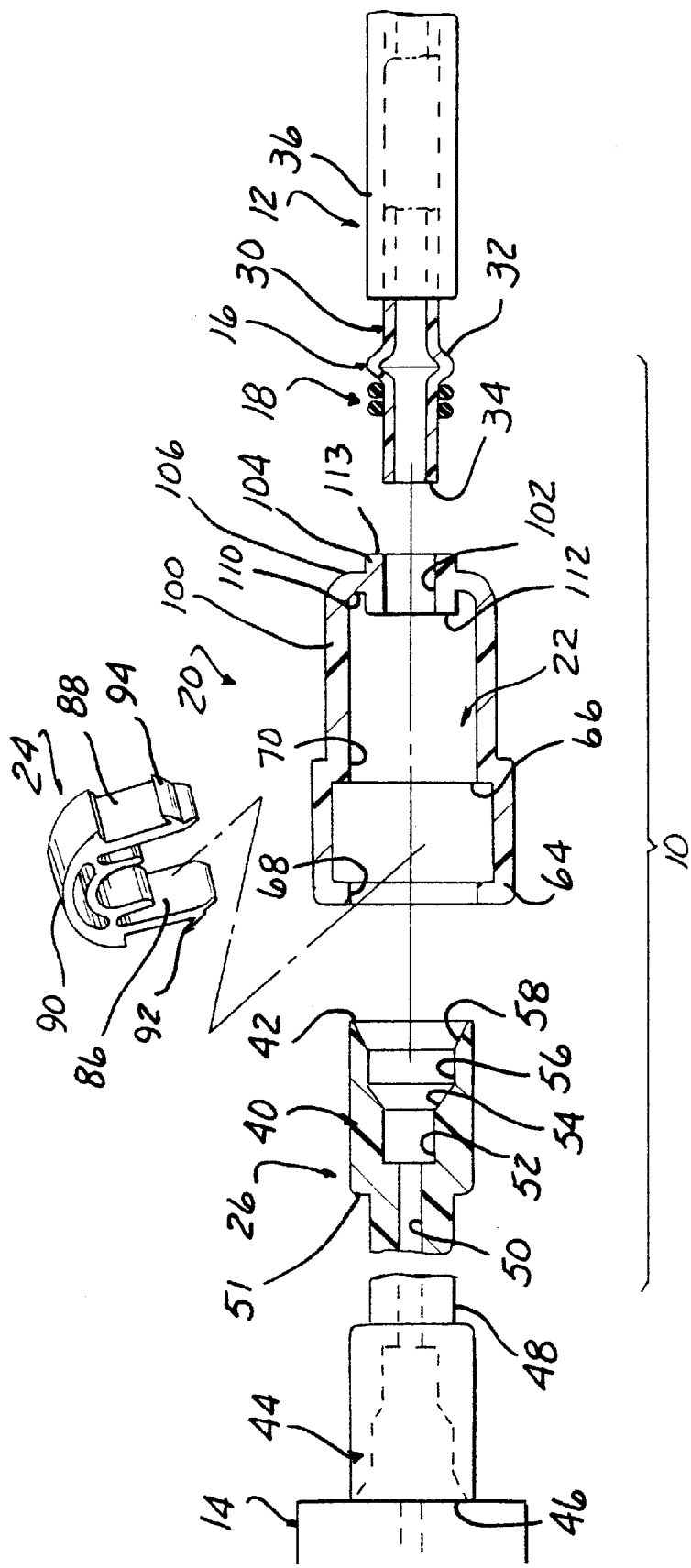
FIG. 1 is an exploded, perspective, partially longitudinally cross-sectioned view of the air flow control quick connector of the present invention used to connect an airflow conduit to an air flow control device.

Referring now to the drawing, and to FIGS. 1–7 in particular, there is depicted an air flow conduit quick connector 10 of the present invention. The quick connector 10 is ideally suited for sealingly connecting a flexible conduit 12, particularly an air flow conduit 12, to an air flow use or control device 14, such as a valve, air compressor, etc.

In general, the quick connector 10 includes a conduit end form 16 carrying one or more seals 18, a female component or housing 20 having an axially extending, longitudinal through bore 22, a retainer 24 and a connection port 26.

The flexible conduit 12 includes an inner tube 30, formed of metal or plastic, such as nylon, by way of example only. An annular flange 32 of an enlarged diameter is formed in the end form 16 of the inner tube 30 spaced from an end 34 of the inner tube 30. One or more seal members 18, including one or more O-rings or a double-lobe single seal 18 is mounted on the end form 16 immediately adjacent one side edge of the annular flange 32, between the annular flange 32 and the end 34 of the inner tube 30.

An outer tube or sheath 36 is mounted over substantially the entire length of the inner tube 30. The outer tube or sheath 36 prevents permeation of exterior contaminants into the inner tube 30. In the present application, an end portion of the outer tube 36 is stripped back or cut away exposing the end form 16 shown in FIG. 1.

The port 26 is formed of any suitable material, such as metal or plastic, with plastic being preferred for its easy moldability and low cost. The port 26 is formed with a first end portion 40 having a first end 42, an opposed second end portion 44 with a second end 46, and an intermediate tubular portion 48 integrally connecting the first and second end portions 40 and 44.

An axial bore 50 extends completely through the first and second ends 42 and 46 of the port 26. The bore 26 preferably has a constant diameter section in the tubular portion 50 and enlarged, stepped portions in the first and second ends portions 40 and 44 as described hereafter.

As shown in FIG. 1, the stepped end portion of the bore in the first end portion 40 of the port 26 includes a first diameter bore portion 52 extending axially from one end of the through bore in the tubular portion 48, a radially outward extending, generally angular or curved step 54 which extends between the first bore portion 52 and an enlarged diameter second bore portion 56. The second bore portion 56 transits into a radially outward extending third bore portion 58 which extends to the first end 42 of the first end portion 40.

The stepped bore in the second end portion 44 of the port 26 may have any configuration, such as the stepped bore configuration in the first end portion 40 or any other bore shape for fluid flow communication and connection to a through bore in the air flow control device 14.

The port 26 is sealingly and securely mounted on the air flow control device 14 by any of a number of suitable connection means. The port 26, for instance, can be integrally molded as part of the air flow control device 14. Alternately, various connectors, such as snap rings, quick connectors, etc. may be employed to mount the port 26 to an outlet flange or collar on the air flow control device 14.

The housing 20 of the quick connector 10 is formed of a suitable material, such as a glass filled nylon 12, by example only. The housing 20 may be formed of other plastic materials, as well as metal.

As shown in FIGS. 1–7, the housing 20 cooperates with the retainer 24 to form a quick connector for securely retaining the port 26 in the housing 20 in a sealed relationship with the end form 16 of the conduit 12. The housing 20 and retainer 24 are similar to that shown in the quick connectors described in U.S. Pat. Nos. 5,542,716, 5,730,481, 5,782,502, 5,863,077 and 5,951,063.

As explained in greater detail therein, the housing 20 is formed of a pair of annular rings 64 and 66, each having a central aperture 68 and 70 extending therethrough and forming part of the through bore 22. A pair of axially extending flat surfaces 72 and 74 are disposed in parallel and diametrically spaced apart to space the annular rings 64 and 66 a predetermined distance apart from each other. The edges 76 of each of the flat surfaces 72 and 74 forms a first aperture 78 extending transversely to the through bore 22. The opposite edges 80 of the flats 72 and 74 form a second aperture 82 aligned with the first transverse aperture 78 and forming a transverse bore extending perpendicularly through the housing 20 to the axially extending through bore 22. The apertures 78 and 82 are sized to releasably receive the retainer 24. As is described in the above mentioned patents, the retainer 24 is formed of a suitable material, such as a plastic, and more preferably, a polyphthalamide (PPA).

The retainer 24 is in a form of a one piece, integrally molded or shaped body having a pair of spaced side legs 86 and 88 which are interconnected at one end by a central end wall 90. Outwardly extending projections 92 and 94 extend axially along a lower portion of each side leg 86 and 88, respectively, and are adapted to releasably snap around the edges 80 on the flats 72 and 74 in the housing 20 to releasably lock the retainer 24 in the fully inserted position in which the retainer 24 engages the shoulder 51 formed between the first end portion 40 and the intermediate portion 48 of the port 26 and forcibly hold the port 26 in a fixed axial position within the housing 20 in a sealing relationship with the end form 16 of the conduit 12.

A pair of axially extending, inner grooves 96 are formed interiorly in the flats 72 and 74 and are adapted to receive the projections 92 and 94 of the retainer 24 to position the retainer 24 in a partially inserted, storage or transport position which allows the port 26 to be inserted through the bore 22. Only when the shoulder 51 has cleared the apertures 78 and 82 in the housing 20 and is disposed at least in line with the inner surface of the annular ring 66 can the retainer 24 be fully inserted into the locked position described above in the housing 20.

Figure 4:
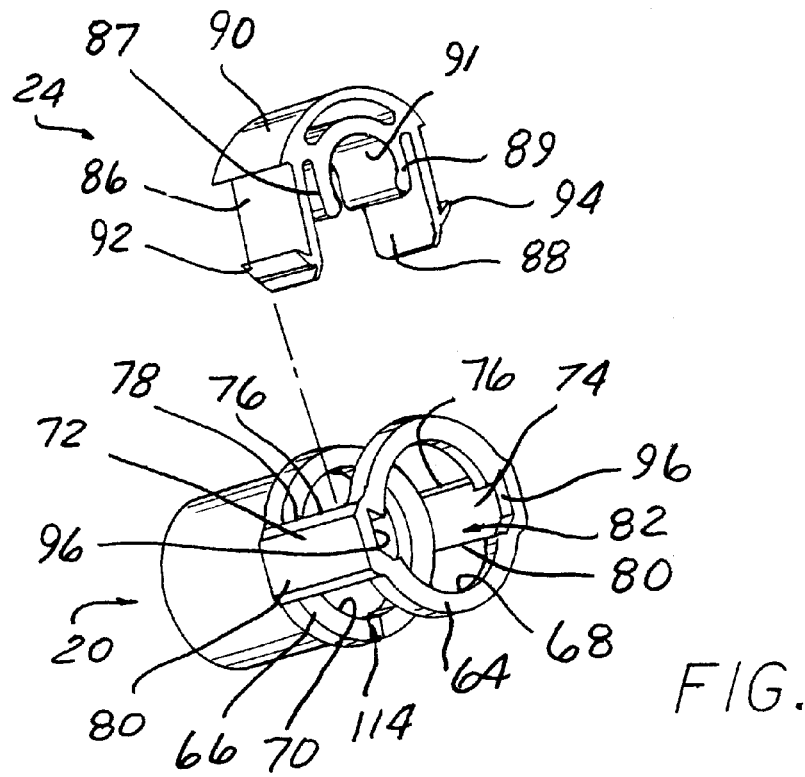
FIG. 4 is an exploded, perspective view of the quick connector of the present invention.
Figure 5:
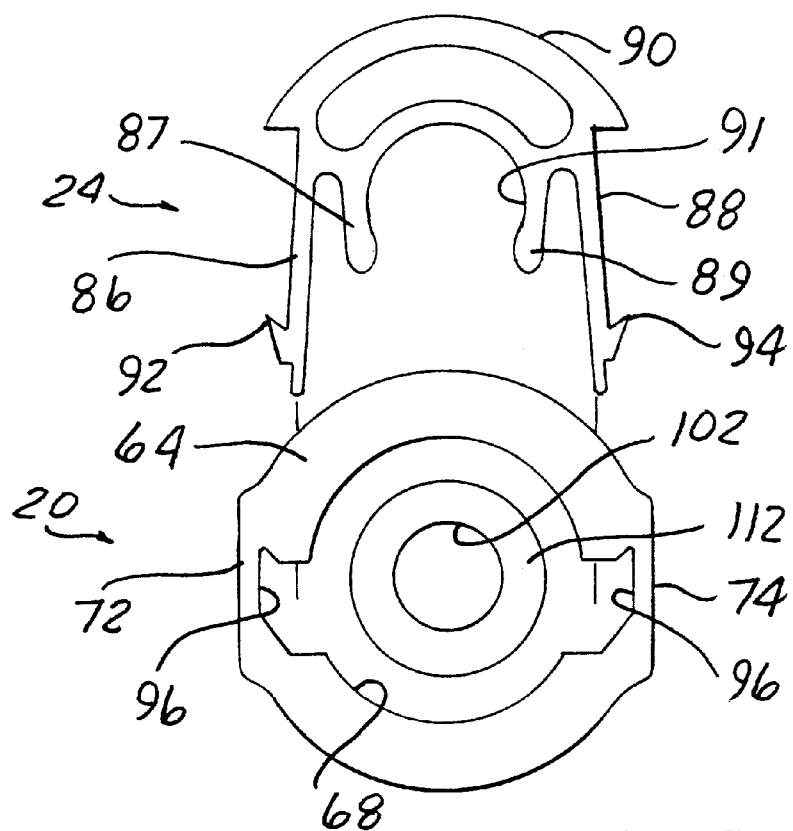
FIG. 5 is a exploded, end view of the quick connector shown in FIG. 4.

As shown in FIGS. 4 and 5, first and second arms 87 and 89 depend from a boss formed adjacent to the end wall 90. An inverted, U-shaped slot 91 is formed on the inner surfaces of the arms 87 and 89 and the boss. The slot 88 is sized to snugly conform to the outer diameter of the intermediate portion of the port 48. The outer ends of each of the arms 87 and 89 are angled or tapered to act as guide surfaces to assist in sliding movement of the arms 87 and 89 over the tubular surfaces to assist in sliding movement of the arms 87 and 89 over the tubular intermediate portion 48 of the port 26.

As shown in FIGS. 1–7, the housing 20 also includes a cylindrical extension 100 with the longitudinally extending bore 22 extending therethrough. A small diameter bore 102 extends through an annular enlargement 104 in the end 106 of the cylindrical extension 100 and has a diameter approximate or slightly larger than the outer diameter of the inner tube 30 of the conduit 12. The annular enlargement 104 projects inwardly from the inner surface 110 of the end wall 106 of the cylindrical enlargement 100 to an inner edge or surface 112. The inner surface 110 of the end wall 106 acts as a stop limiting the distance of insertion of the port 26 into the housing 20. The inner surface 112 on the annular enlargement 104 will then be positioned to engage and bias the flange 16 on the end form 18 of the conduit 12 urging the end form 16 to the left, in the orientation shown in FIG. 1, and secure sealing engagement with the inner surface of the first end portion 40 of the port 26, as described hereafter.

Referring now to FIGS. 2–6, the sequence of assembly of the air flow conduit quick connector 10 of the present invention will now be described.

Figure 2:
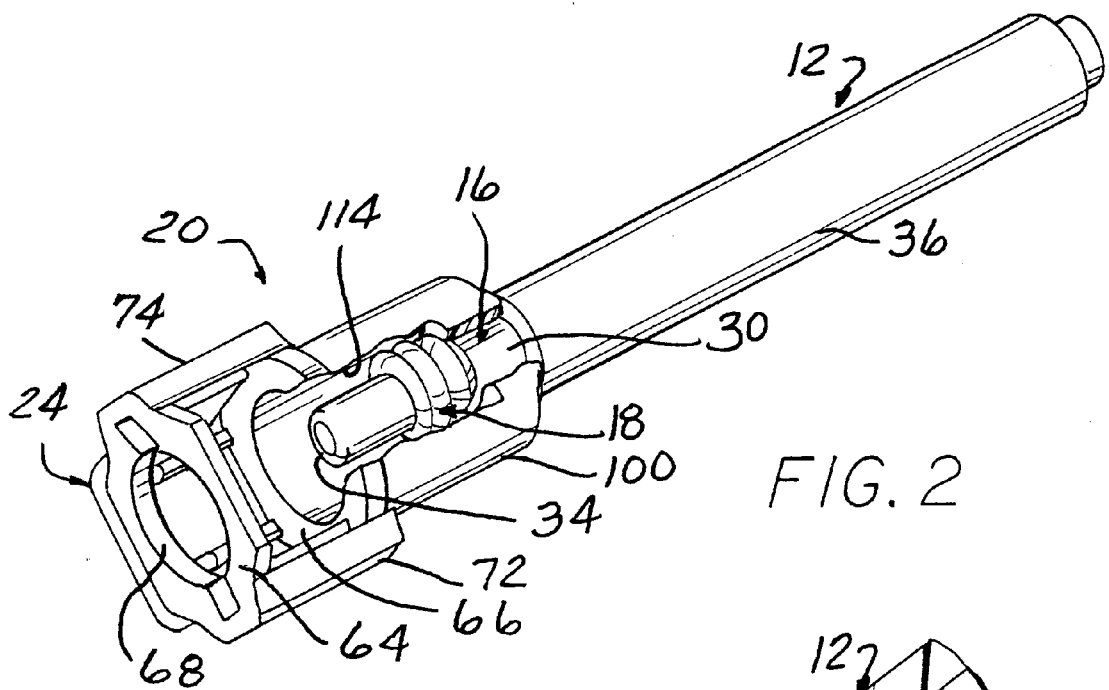
FIG. 2 is a perspective view of the quick connector to the present invention shown in a partially assembled state.

Beginning with the assembly shown in FIG. 2, the end form 16 of the conduit 12, from which the end portion of the outer sheath or tube 36 has been removed, is inserted through a slot 114 formed in the housing 20. The slot 114 is located adjacent to the locking surfaces or edges 80 on the flats 72 and 74 and extends from the end 106 through the ring 66. The slot 114 enables the end form 16 of the conduit 12 to be inserted into the housing 20.

Figure 3:
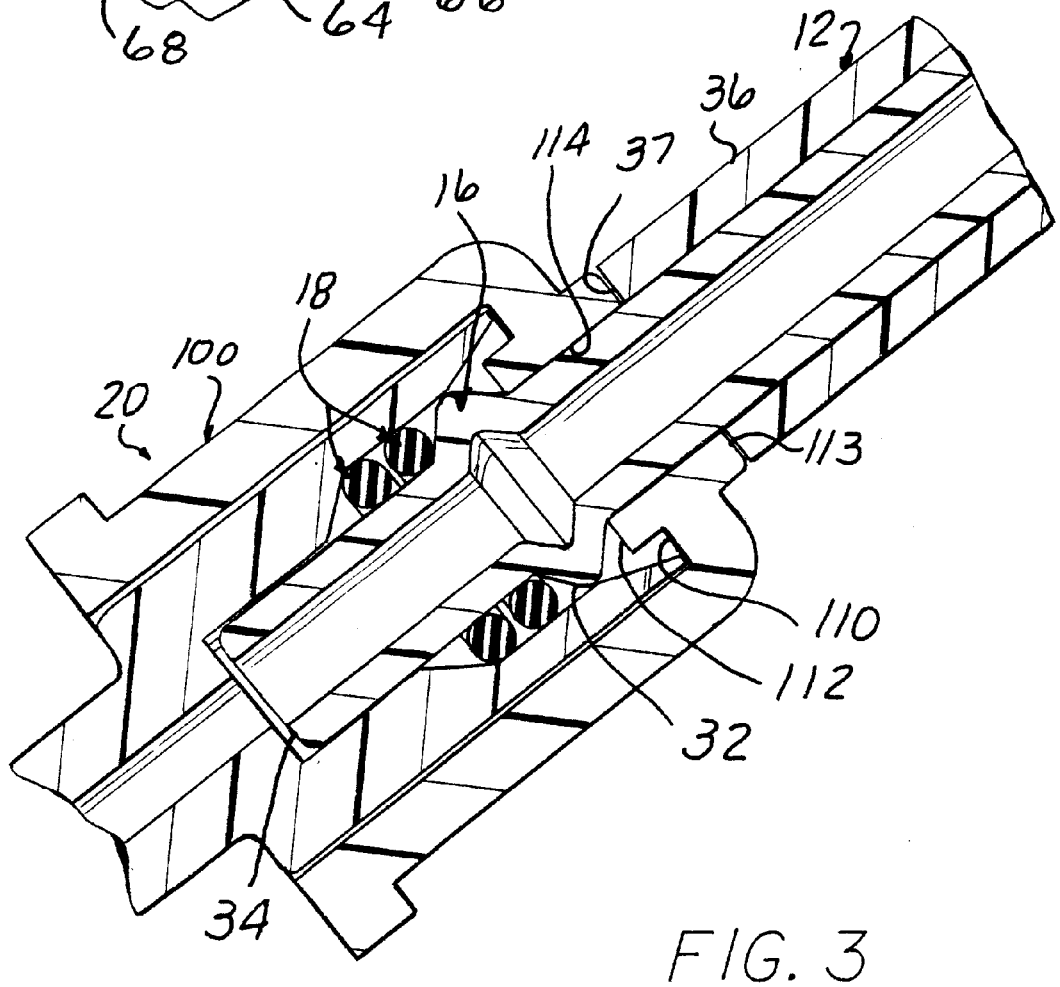
FIG. 3 is an enlarged, partial, perspective, longitudinal, cross-sectional view showing the quick connector of the present invention in a fully assembled state with an air flow conduit and port.

In this position, as shown in FIG. 3, the end 37 of the outer sheath or tube 36 is disposed in substantial registry with the outer surface 113 of the annular enlargement 110. The inner surface 112 of the enlargement 110 is disposed in contact with one side or edge of the flange 32 on the end form 16 to bias the end form 16 to the left of the orientation shown in FIG. 2 into secure engagement with the port 26.

Figure 6:
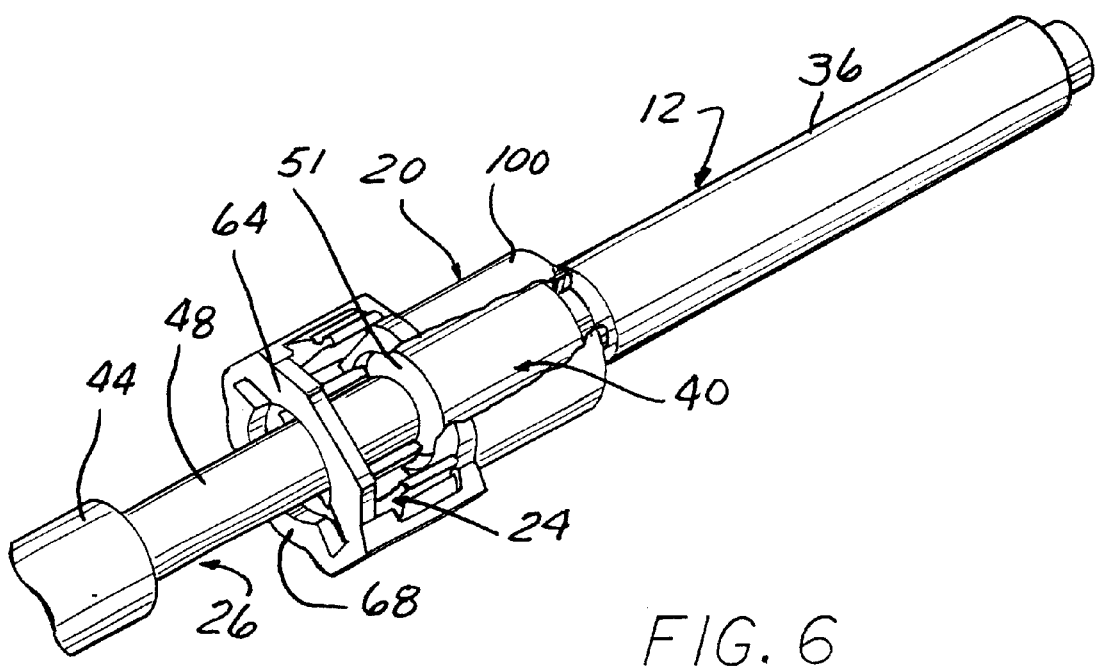
FIG. 6 is a perspective view of the fully assembled quick connector of the present invention.

Next, as shown in FIGS. 3 and 6, the housing 20 and the port 26 are moved relative to each other to cause the first end portion 40 and a part of the intermediate tubular portion 48 of the port 26 to be inserted through the apertures 68 and 70 in the annular rings 64 and 66 on the housing 20 until the end 42 of the first end portion 40 of the port 26 is disposed in contact with the inner wall 110 of the annular enlargement 104 on the cylindrical portion 100 of the housing 20. During such sliding insertion of the port 42 into the housing 20, the end bore portion 58 in the first end portion 40 of the port 26 will initially engage the seal member or members 18. The slightly inclined or ramped surface of the end bore portion 58 will center and guide the port 26 over the seal members 18 until the seal members 18 are disposed in secure sealing contact with the outer surface of the inner tube 30 of the end form 16 in substantial engagement with the shoulder 54 in the stepped bore in the first end portion 40 of the port 26.

In this position, the end portion 34 of the end form 36 is disposed in contact with the first bore portion 52 of the port 26 which first bore portion 52 acts as a bearing surface for the end form 16.

It will be understood that only when the port 26 has been fully inserted into the cylindrical extension 100 of the housing 20, with the shoulder 51 on the inner end of the first end portion 42 of the port 26 disposed in alignment with the inner edge of the annular ring 66 of the housing 20 or axially beyond the inner edge into the hollow interior of the cylindrical extension 100, can the retainer 24 be forcibly urged from the temporary storage position to the fully inserted position wherein the projections 92 and 94 snap around and lock over the lock edges 80 on the flats 72 and 74 of the housing 20. In this position, one side edge of the retainer 24 will engage the shoulder 51 on the port 26 to prevent axial disengagement or separation of the port 26 from the conduit 12.

When it is desired to intentionally separate the port 26 from the end form 16 of the conduit 12, the ends of the side legs 86 and 88 of the retainer 24 are forced radially inward until the projections 92 and 94 on the side legs 86 and 88, respectively, disengage from the lock edges 80 on the housing 20 thereby allowing retainer 24 to be pulled to the temporary storage position in the housing 20. The housing 20 and the conduit 12 may then be separated from the port 26 or, alternately, the housing 20 can be left mounted on the port 26, with the end form 16 of the conduit 12 urged through the slot 114 in the housing 20 thereby again separating the conduit 12 from the port 26.

Figure 7:
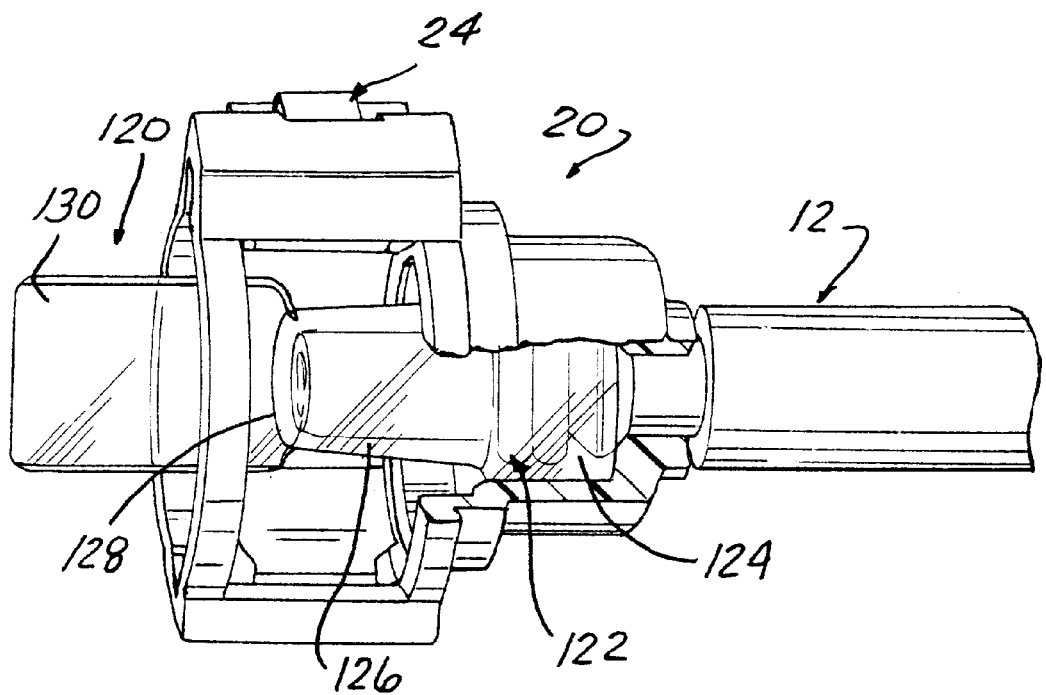
FIG. 7 is a bottom perspective view of the quick connector of the present invention shown in a shipping condition attached to the flexible conduit and carrying a dust cover.

Referring now to FIG. 7, there is depicted a temporary dust cover 120 which is used during storage or shipment of the assembled conduit 12, the quick connector housing 20 and the retainer 24 from the manufacturing facility to the facility or site where the quick connector 10 and the conduit 12 will be connected to the port 26 on the air flow device 14.

The dust cover 120 has a cap portion 122 formed of a hollow annular end 124 and a slightly smaller diameter intermediate portion 126. The portions 124 and 126 are devised to snap over the flange 32 on the end form 16. A closed end 128 on the intermediate portion 126 covers the open end 34 of the end form 16. A generally planar finger tab or handle 130 projects from the closed end 128 exteriorly of the outer end of the housing 20. The finger tab 130 provides a surface to enable an installer to both insert the dust cover 120 through the end of the housing 20 into engagement with the end form 16 or to remove the dust cover 120 from the housing 20 prior to installation of the housing 20 and the conduit 12 on the port 26.

In summary, there has been disclosed a unique air flow conduit quick connector which provides simple and quick interconnection of the air flow conduit and a port on an air flow control device as well as low insertion force, full sealed engagement between the components, and an indication of complete sealing engagement of the conduit and the port. At the same time, the housing and the retainer portions of the quick connector may be assembled and manufactured in conformance with the dimensions of the end form 16 on the conduit 12 to prevent undesirable tolerance build up which may occur when different components of an assembly are manufactured by different manufacturers.

What is claimed is:

1. A fluid conduit to air flow device connection comprising:

an end form on a conduit having an annular enlarged diameter flange spaced from one end of the conduit;

a seal member mounted on the conduit adjacent to the flange;

a port adapted to be carried on an air flow device, the port having a through bore extending therethrough and a shoulder formed between an intermediate tubular portion and an end portion;

a housing having a through bore extending between first and second ends;

a transverse bore formed in the housing intersecting the through bore;

a retainer transversely insertable through the transverse bore into locking engagement with the housing, the retainer having a side edge;

the end form on the conduit insertable into the housing with the flange on the end form spaced from the second end of the housing; and the port insertable through the first end of the housing into the through bore to a fully sealed engagement with the end form of the conduit wherein the retainer is movable through the transverse bore to bring the side edge of the retainer into engagement with the shoulder on the port to prevent axial displacement of the port from the conduit and to maintain the port in engagement with the end form.

2. The connection of claim 1 wherein the seal is a double lobe seal.

3. The connection of claim 1 wherein the shoulder on the port is spaced from a first end of the port.

4. The connection of claim 1 wherein the conduit comprises:

a flexible conduit having an inner conduit and an outer conduit disposed over the inner conduit, the end form disposed on the inner conduit and projecting outward from one end of the outer conduit.

5. A fluid conduit to air flow device connection comprising:

a conduit formed of an inner conduit and an outer conduit disposed over the inner conduit, an end form disposed on the inner conduit and projecting outward from one end of the outer conduit, the end form on the inner conduit having an annular enlarged diameter flange spaced from one end of the inner conduit;

a seal member mounted on the conduit adjacent to the flange;

a port adapted to be carried on an air flow device, the port having a through bore extending therethrough and a shoulder formed between an intermediate tubular portion and an enlarged end portion;

a housing having a through bore extending between first and second ends, the end of the outer conduit abutting the second end of the housing;

a transverse bore formed in the housing intersecting the through bore;

a retainer insertable through the transverse bore, the retainer having a side edge;

the end form of the conduit insertable into the housing with the flange on the end form spaced from the second end of the housing; and the port insertable through the first end of the housing into the through bore to a fully sealed engagement with the end form of the conduit wherein the retainer is movable through the transverse bore to bring one side edge of the retainer into engagement with the shoulder on the port to prevent axial displacement of the port from the conduit.

6. The connection of claim 1 further comprising:

an inner surface formed adjacent the second end of the housing, the inner surface positioned to bias the flange on the conduit into engagement with the port.

7. The connection of claim 1 further comprising:

the housing including a slot extending from the second end partially through the housing, the slot receiving the end form of the conduit for insertion of the end form of the conduit into the through bore of the housing.

8. The connection of claim 1 wherein the housing comprises:

a chamber axially spaced from the transverse bore, the chamber receiving the joined end form and the end portion of the port.

* * * * *